United States Patent [19]

Montalbano

[11] Patent Number: 4,633,567

[45] Date of Patent: Jan. 6, 1987

[54] METHOD AND APPARATUS FOR MAKING A TOOL

[75] Inventor: Anthony J. Montalbano, Lake Barrington Shores, Ill.

[73] Assignee: Amerace Corporation, Hackettstown, N.J.

[21] Appl. No.: 606,361

[22] Filed: May 2, 1984

Related U.S. Application Data

[62] Division of Ser. No. 455,387, Jan. 3, 1983, Pat. No. 4,460,449.

[51] Int. Cl.[4] ............................ B23P 9/00; C25D 1/00

[52] U.S. Cl. ........................................ 29/445; 204/281

[58] Field of Search .................. 29/445; 204/279, 280, 204/281

[56] References Cited

U.S. PATENT DOCUMENTS 1,658,713 2/1928 Fuller .............................. 29/DIG. 4

*Primary Examiner*—Howard N. Goldberg

*Assistant Examiner*—Ronald S. Wallace

*Attorney, Agent, or Firm*—David Teschner; Ronald Sandler

[57] ABSTRACT

A tool for producing a pattern of highly accurate optical quality surfaces and the method of making same from a series of bi-metallic pins. A high strength metal pin is coupled to a slug of metal of lesser strength capable of being accurately scribed. The supporting pin blank preferably is magnetic stainless steel and the slug is of copper. A group of such bi-metallic pins then is placed in an appropriate fixture after which an optical configuration, such as the three faces of a cube-corner element, are scribed into the copper ends. A completed tool may then be electroformed to produce an electroformed tool from an array of the like or different pins, arranged in various patterns.

10 Claims, 12 Drawing Figures

FIG. 1 PRIOR ART
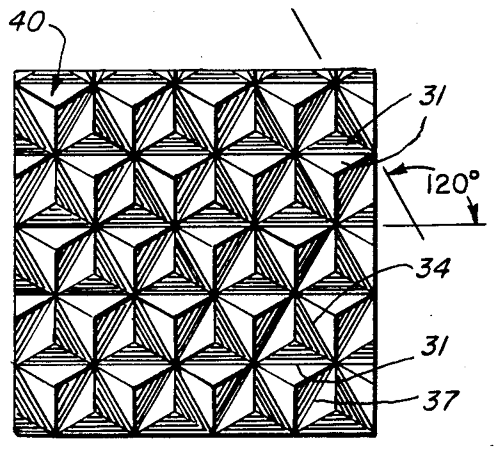
FIG. 2
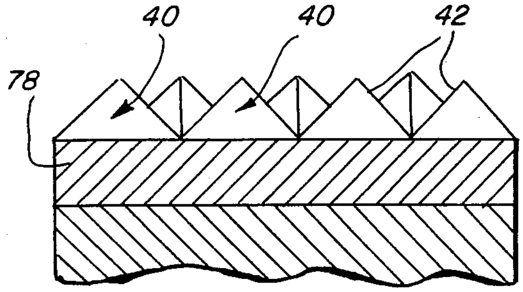
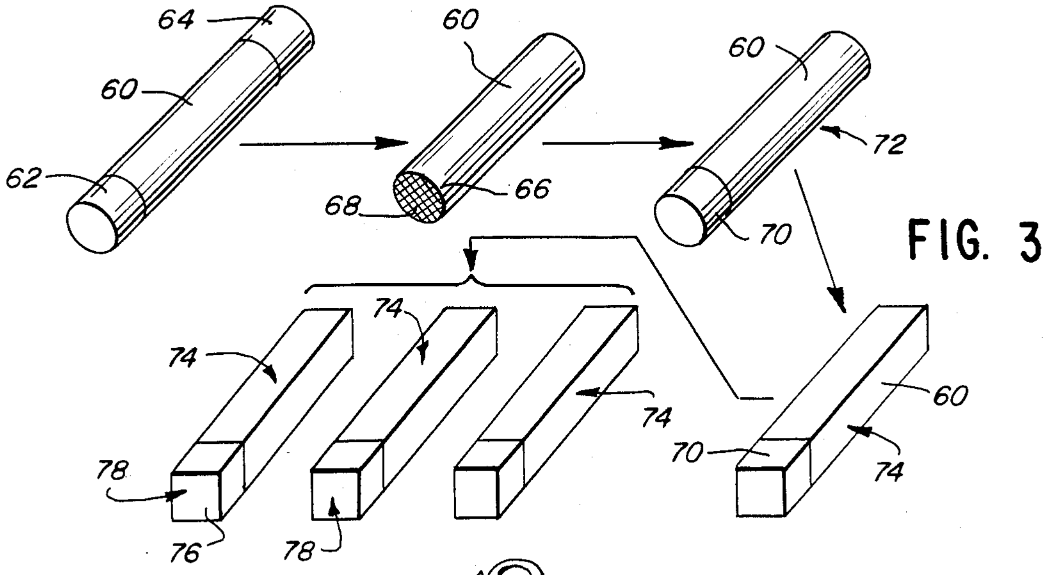
FIG. 3
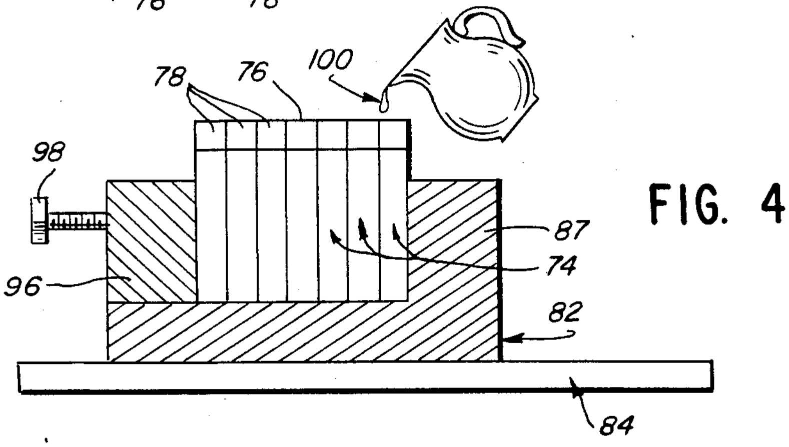
FIG. 4

FIG. 5
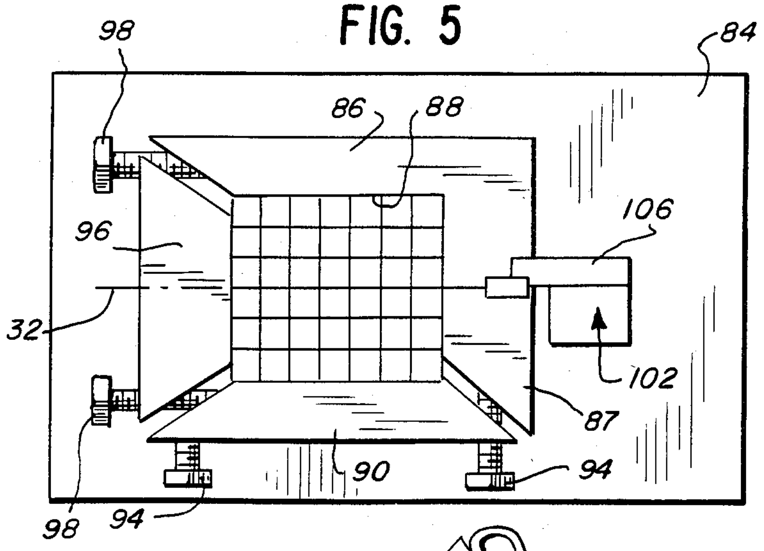
FIG. 5a
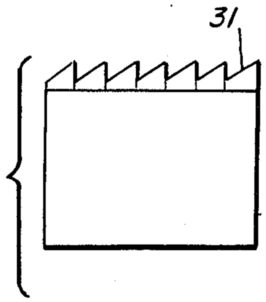
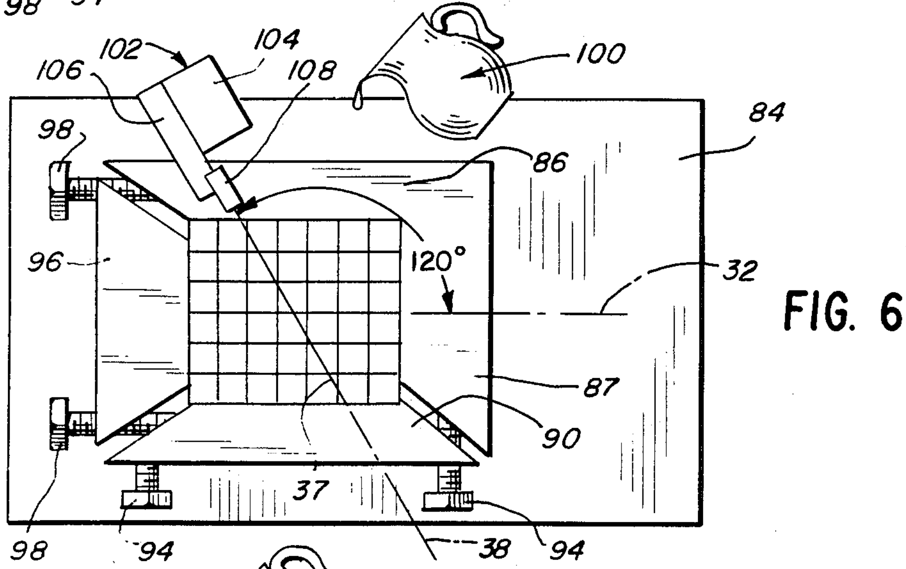
FIG. 6
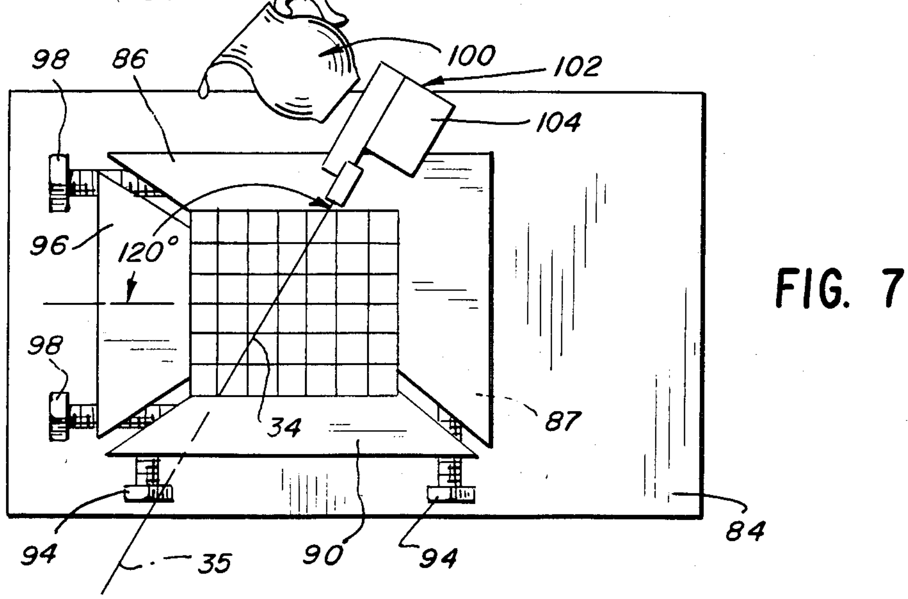
FIG. 7

METHOD AND APPARATUS FOR MAKING A TOOL

BACKGROUND OF THE INVENTION

This application is a division of application Ser. No. 06/455,387 filed Jan. 3, 1983 by Anthony J. Montalbano, now U.S. Pat. No. 4,460,449.

FIELD OF THE INVENTION

The invention is directed to the field of optics and more particularly to methods and apparatus for producing tools and tool inserts having patterns of highly accurate optical configurations thereon, such as cube-corner elements, useful in the manufacture of retroreflective sheeting and other retroreflective or lens-type parts.

DESCRIPTION OF THE PRIOR ART

The production of retroreflective sheeting requires highly accurate cube-corner patterns of an extremely small size as compared to the size of cube-corners used on retroreflective lenses such as pavement markers or automotive lenses. In larger reflectors, such lenses may be molded directly against a group of pins, or a group of pins may be used to form an electroform mold insert. The machining of the faces of these relatively larger pins is relatively simple and ordinary tools and well known techniques and methods are employed. Generally, a single such pin is used to form a single cube-corner or other optical element.

The requirement for very small, accurately formed cube-corners to be used in retroreflective sheeting (e.g. 0.006" on edge), demands that precision scribing or ruling be employed. Heretofore, in producing tools for sheeting, relatively large aluminum blocks have been scribed to produce masters which are then replicated. The great number of lines which must be scribed into a hard pin stock causes the rapid deterioration of the expensive diamond cutting element and the replacement thereof. Any change in the cutting element during scribing may result in misalignment relative to previously scribed lines, or cause irregularities in line shape, and to size, depth and flatness of the surfaces formed by the scribed lines. While an array of cube-corner elements could be cut from a block of relatively soft material, it is not possible to accurately provide a variety of different optical patterns in a single block. Efforts to form multiple paterns of elements result in other problems during the electroforming stage because of the difficulty in holding multiple small pins together. While accurate steel pins minimize fins formed in interstices between pins during electroforming, which is of primary importance when the resulting tool is used to emboss plastic film and the film formed is only about 0.003" thick, such steel pins, because of their hardness, cannot be scribed effectively and economically.

The ability to make the bi-metallic pin of the type contemplated by the present invention also permits substantial design flexibility, not only for retroreflective sheeting and other lens-type elements, but permits custom optical design of multiple repeating optical patterns, or of contours, or of multiple orientations of single patterns, as well as the use of arrays of various size elements. Additionally, the ability to break a contiguous array into smaller elements permits the breaking up of any irregularity in the pattern which might be present due to very minor irregularities in scribing which are visible over large uninterrupted patterns. While it is known to use an electroless nickel-plated metal master where large patterns are contemplated, to applicant's knowledge no one has employed the particular combination of elements and in the sizes and arrays of the present invention.

SUMMARY OF THE INVENTION

The present invention overcomes the difficulties noted with respect to prior art pins and with the methods of using such pins to produce electroform mold inserts to be used in the manufacture of retroreflective sheeting having a pattern of precise, cube-corner type retroreflective elements therein. The method and pins so formed also permit the manufacture of tools for embossing, molding or casting all other lens type elements of small size with a variety of patterns while minimizing scribing problems. Furthermore, such pins permit the assemblage of different scribed patterns in a single lens type product including those of multiple repeating optical patterns. They also permit "contouring" of the pins to produce lens elements not precisely produced because of size and assembly limitations. Furthermore, the ability to use relatively small pins each having a large number of optical elements scribed on the end thereof, and rotating or staggering adjacent pins or rows of pins, permits one to provide multiple "breaks" in any line deviation which occurs during scribing. Such extended but minor errors in lines scribed in large parts become optically enhanced and exaggerated to an observer, even where the deviation is on the order of mils. By utilizing small pins and repositioning adjacent pins, such deviations become merged with and do not detract from the esthetic value of the finished part.

In accordance with the present invention, a slug of copper is fixed to a supporting pin blank of a magnetic material of a size and physical strength able to withstand accurate machining and yet retain its hardness and dimensional stability. The copper slug, while providing adequate strength to retain the shapes and finish of the lines to be scribed therein, nonetheless is soft enough to permit the lines to be accurately scribed without excessive tool wear. The copper slug may be formed on an end of the supporting pin blank as by plating or vacuum deposition or a slug of copper may be attached as by welding, brazing or cold welding.

A group of the bi-metallic pins then is placed in a suitable fixture and a series of lines is scribed into the copper ends of the bi-metallic pins. The cutting pattern when complete provides a plurality of optical quality surfaces capable of producing a like pattern. The scribed pins then can be arranged in any desired pattern with other pins, or in a contour, and used as a master to provide an electroform which then provides a tool which is the reverse of the assembled pin ends (i.e., the pin faces are male resulting in an electroform which is female). When used as a mold insert, the tool reproduces the pattern of the original pins.

Typically, when used to produce retroreflective sheeting, the bi-metallic pins produced in accordance with the present invention preferably are in the range of 0.15 to 0.17 inches square and may have produced thereon from between about 600 to about 1400 cube-corner-type elements on the end of each pin. Such small cube-corner elements, also provide substantial advantages in the production of automotive lenses in that they permit both contouring and angling of the cube axes relative to the lens elements so as to provide what is known in the art as angled reflex, while accomplishing this with less pin slippage and permitting the use of a thinner lens element with resultant savings in material, as well as permitting substantial styling features.

It therefore is an object of the present invention to produce an improved pin for use in making tools to produce optical quality members having a repeating optical pattern.

It is another object of this invention to produce a bi-metallic pin for use in making electroforms.

It is another object of the invention to produce a bi-metallic pin for use in making electroforms which substantially retain the strength of pins presently used for such function while providing a portion which facilitates the accurate scribing of a face thereof.

It is yet another object of this invention to produce a bi-metallic pin for use in making electroforms which is fabricated from a metallic pin blank of a magnetic stainless steel to which a slug of copper is coupled giving a copper end face readily and accurately scribable.

A further object of this invention is to produce a tool for the generation of electroforms which employs a plurality of bi-metallic pins fabricated from a metallic pin blank of a magnetic stainless steel to which a slug of copper is coupled giving a copper end face readily and accurately scribable.

A further object of the present invention is to produce an improved pin for use in making tools to produce retroreflective sheeting, the pin elements being in the range of between 0.15 to 0.17 inch square, and carrying on the ends thereof a number of cube-corner elements, ranging from between about 600 to about 1400 cube-corner elements on each pin.

A further object of the invention is to produce an improved bi-metallic pin for use in making tools to produce optical-quality retroreflective sheeting in which the axes of the cube-corner elements may be inclined relative to the axes of the pins, and in which each pin has on the end thereof a plurality of cube-corner elements in the range of between about 600 to about 1400 cube-corner elements, and in which adjacent pin elements are rotated 90° so as to enhance the orientation and entrance angle characteristics of the sheeting produced using such pins.

Other objects and features of the invention will be pointed out in the following description and claims and illustrated in the accompanying drawings which disclose, by way of example, the principles of the invention and the best mode which has been contemplated for carrying them out.

BRIEF DESCRIPTION OF THE DRAWINGS

In the drawings in which similar elements are given similar reference characters:

FIG. 1 is an end view of an electroform known in the prior art but formed by bi-metallic pins constructed in accordance with the invention disclosed herein;

FIG. 2 is an elevational view of a pin used to produce the electroform of FIG. 1, partly in section; and FIGS. 3 through 11 represent, in a diagramatic flow chart fashion, the various steps in producing a bi-metallic pin of the present invention and the manner in which a plurality of such bi-metallic pins are assembled to produce a tool for the generation of an electroform.

DESCRIPTION OF THE PREFERRED EMBODIMENT

Figure 8:
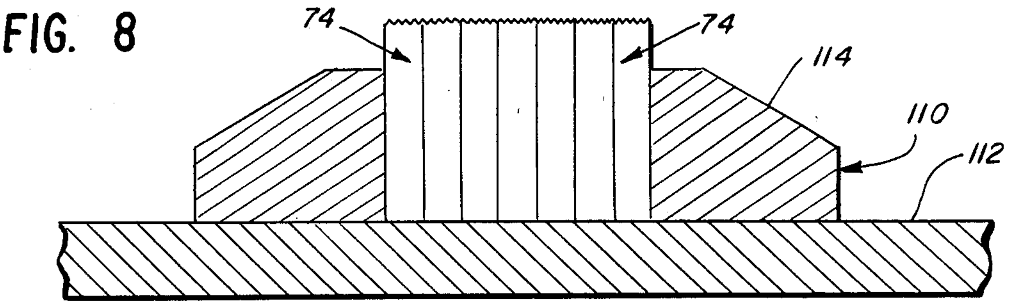

Turning now to the drawings, there are shown the various aspects of the invention for making a bi-metallic pin which is the basic building element for producing a tool from which can be made highly accurate electroforms useful as mold inserts in the producing of optical quality parts, such as retroreflective sheeting.

A round rod 60 of a suitable metal, such as magnetic stainless steel, having a hardness value of about Rc45–50 is used. The rod 60 which constitutes the pin blank may be approximately 0.22 to 0.26 inches in diameter and approximately 1⅝ inches long. The end portions 62 and 64 (FIG. 3) may be ground off the rod 60 to assure that the ends of the rod 60 are perpendicular to the rod's longitudinal axis.

The exposed face 66 created when the end portion 62 is removed is then abraded as at 68 to improve the adhesion thereto of a softer material which is capable of being accurately scribed. The preferred material is copper which is relatively easy to scribe but which maintains its durability during subsequent operations. A copper slug 70 then is fixedly coupled to the face 66 of rod 60. In the preferred construction, the copper slug 70 is developed on the rod 60 by plating. However, the slug 70 also can be developed on rod 60 by vacuum deposition. Alternatively, in place of building up the copper slug 70 on the end face 66 of rod 60, a slug 70 of the desired dimensions can be attached directly as by welding, brazing, staking, cold welding or the like. The copper slug 70 preferably is about 0.03 to 0.10 inches thick and preferably about 0.05 inches. Once the copper slug 70 is in place, it may be ground and deburred to assure that the overall bi-metallic pin 72 is of the correct length of approximately 1.45 to 1.65 inches.

Since the cylindrical bi-metallic pins 72 cannot be grouped with their individual longitudinal axis parallel to one another without gaps between adjacent pins, the cylindrical pins 72 are formed to polygon shapes which will permit the pins to be juxtaposed without gaps therebetween. Accordingly, the pins may be given a cross-section along their longitudinal axes which is rectangular, triangular, square, or hexagonal (referred to herein as regular polygons). In the preferred embodiment, the cylindrical bi-metallic pins 72 are machined and ground into rectangular bi-metallic pins 74 (FIG. 3) of approximately 0.160×0.165 inches. The face 76 of each pin 74 is made quite smooth and flat and the edges square so that a plurality of pins 74 can be contiguously grouped without space between adjacent pins 74. The magnetic characteristics of the lower portion 60 of the pins 74 is important because that portion of the pins assists in the holding of the pins during accurate machining to the desired polygon cross section.

A group of the machined pins 74, representative of a larger number of such pins, then are placed into an adjustable fixture 82 (FIG. 4) which rests upon a base 84. The fixture 82 has two fixed walls 86, 87 which form an L-shaped open area 88 (FIG. 5) arranged to receive the group of pins 74. Two adjustable walls 90 and 96 complete the open area 88. Wall 90 is advanced or retracted relative to fixed walls 86 and 87 by means of conventional lead screws 94. Similarly, wall 96 may be moved with respect to fixed walls 86, 87 by means of lead screws 98. By positioning the pins 74 at the interior juncture of the two legs of fixed walls 86 and 87 and by advancing or retracting the adjustable walls 90 and 96, the assembled pins 74 can be tightly grouped relatively free of any spaces therebetween or between the pins 74 and the walls 86, 87, 90 and 96. After the pins 74 are tightly packed in the fixture 82, the fixture is covered with an epoxy or curable polyester which has a hardness and machinability approximately equal to that of the rectangular copper slug 78. A suitable epoxy which can be used is Hardman No. 8173 and a curable polyester is Decra-Coat made by Resco. The epoxy or curable polyester (hereinafter called filler for ease of reference) may be poured as from pitcher 100 and the excess removed from the end surface of the copper slug 78 which is visible above the walls 86, 87, 90 and 96.

Once the filler has hardened, the base 84 and fixture 82 are positioned relative to a scribing device illustrated generally at 102. The cutting device 102 is intended to scribe a plurality of grooves into the exposed faces 76 of the copper slugs 78 on each pin 74. When the pins are used to produce cube-corner type relector elements of a non-tilted variety, then three series of parallel grooves will be scribed in each face, each groove being rotated 120° with respect to the other two series of grooves resulting in the generation of a series of cube-corners or pyramids projecting above the bases of the grooves.

The cutting device 102, shown rather schematically, comprises a motor and positioning device 103, and a track 106 along which a diamond cutter 108 is moved. Alternatively, the cutter 108 may be fixed and the fixture 82 and pins 74 moved with respect to such cutter 108. The cutting device 102 is shown aligned with axis 32 of the base 84. A groove 31 then is scribed in the end faces 76 of slugs 70, the depth and shape of which is determined by the shape of the cutter 108 and the depth to which it has been adjusted to cut. FIG. *5a* is representative of a single pin 74, greatly enlarged, through which a series of grooves 31 have been scribed on end thereof. For precision work, the grooves may be created by the repetitive scribing of each line a number of times, each pass removing additional material and making the groove deeper. Each groove 31 may have a depth ranging approximately from 0.003 inches to 0.0065 inches. The sides of the cutter 108 operating along the groove walls renders them smooth with a mirror-like finish. For example, a cutter 108 having a triangular shaped cutting section will produce groove walls 42 (FIG. 2) which are inclined; and the three grooves together will produce tetrahedrons or cube-corners 40 raised above the groove root. The term "cube-corner" is an art recognized term which simply means three mutually generally perpendicular faces without regard to the size or shape of the three faces operate to retroreflect light in accordance with well-known optical principles. After each groove 31 has been completed, the cutter 108 is indexed to the next cutting position aligned with and parallel to the previously scribed groove 31. Typical groove spacing will be in a range corresponding to the height to be used.

Once all of the first series of grooves 31 are cut, all of the epoxy or curable polyester remaining is removed and a new epoxy or curable polyester filler is applied to all spaces and to the first set of grooves. This procedure allows a second set of grooves to be cut as if the first set of grooves 31 were not present. A second set of grooves 37 (FIG. 6) are cut along an axis 38 positioned 120° relative to the axis 31. Removal and replacement of the filler as after scribing the first grooves 31, is again effected. A third set of grooves 34 (FIG. 7) then is scribed along an axis 35 after the cutting device or fixture 102 again has been indexed 120°. Upon competion of the scribing of three sets of grooves 31, 34 and 37, the remaining filler is removed from the cutting fixture 82.

If desired, the shape and angle of the cutter may be selected such that the cube-corner elements are tilted. That is, assuming the cube-corner axis is designated as the trisector of the three faces of the cube-corner element so formed, then that axis will be inclined at some predetermined angle relative to the longitudinal axis of the pin 74. Producing such angled or tilted axes pins will permit the part molded or embossed from the finished tools to have enhanced entrance or orientation angle response characteristics. A series of such tilted pins, or even of pins of non-tilted variety or of other configurations, then may be assembled to produce a repeating optical pattern having desired orientation and entrance angle response characteristics. The arrangement of square pins having single cube-corner elements arranged on the ends thereof for enhanced orientation angle characteristics is old. The advantage, however, of using a multiple of relatively small pins of the present invention with multiple small cube-corners on each pin, is that at the minimum anticipated viewing distances where reflective sheeting or the like may be used, such as, for example, 50 feet from the driver, the angle of arc subtended would be only approximately one minute. At such distance, therefore, any otherwise noticeable difference between pins would be essentially invisible to the observer and the resultant sheeting produced thereby would appear to have a smooth, unbroken and uniformly illuminated appearance. If desirable, pins in adjacent rows also may be staggered relative to the other to assure a uniform pattern and to "break up" any extended error or deviation formed during scribing, even though that deviation may be relatively minor in dimension.

Figure 9:
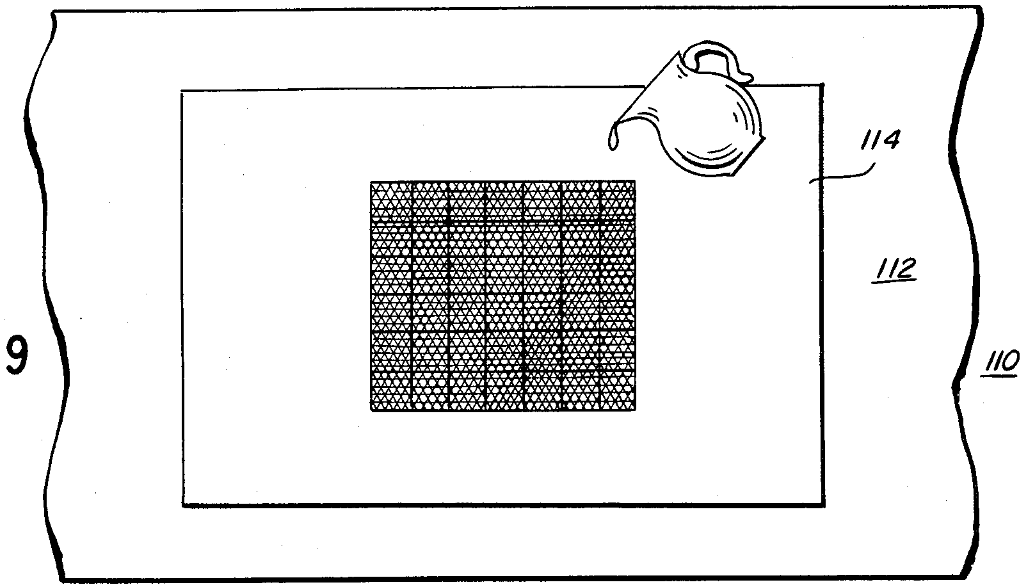
Figure 10:
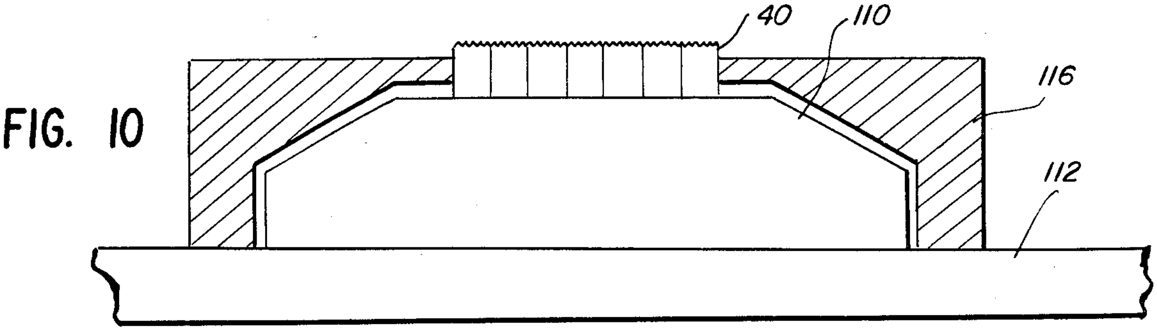
Figure 11:
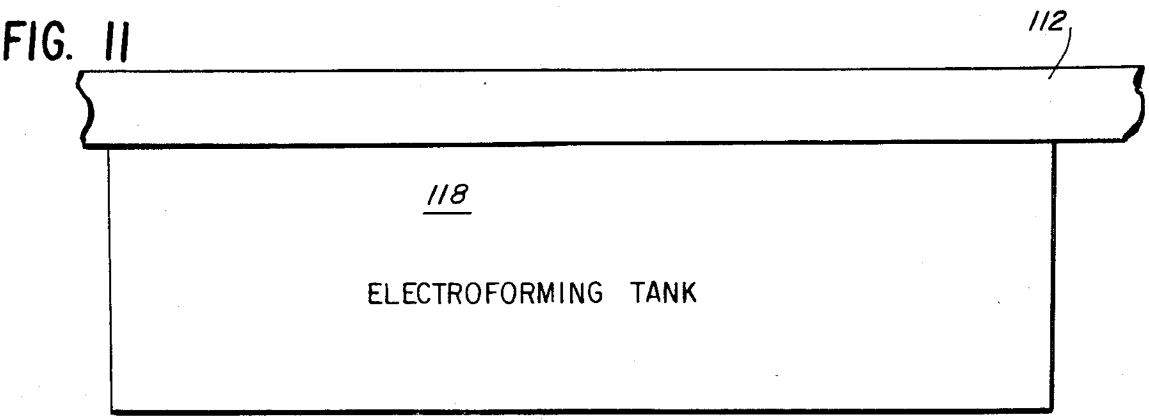

A group of pins 74 with the desired optical surfaces are then repositioned in an electroforming fixture 110 (FIGS. 8–10) in a predetermined pattern, or with a desired contour. A single unbroken wall 114 is positioned on base 112 to retain the pins 74. Any spacing between the pins 74 and the wall 114 then is filled with a conductive material which may be solder, silver wire, etc. This conductive material should provide a good seal between the pins 74 and the walls 114, and be at least as conductive as the pins 74 and capable of being cleanly removed so that the pins 74 can be used again. A cover 116 is then placed over the fixture 110 so that only the tetrahedrons or cube-corners 40 extend above the cover 116. The entire assembly of fixture 110, cover 116 and pins 74 are placed into an electroforming tank 118 to produce a female replication of the male pins 74 in a manner well known in the art. If it is desired to protect portions of the fixture or cover or control the electroform depth with respect to portions of the pins, suitable shields may be employed.

While there has been shown and described and pointed out the fundamental novel features of the invention as applied to the preferred embodiment, it will be understood that various omissions and substitutions and changes of the form and details of the devices illustrated and in their operation may be made by those skilled in the art, without departing from the spirit and scope of the invention.

What is claimed is:

1. The method of making a bi-metallic pin for use in making electroforms or molds for producing optical quality part, comprising the steps of: forming a metallic pin blank of high strength characteristics having a first end and a second end; coupling a slug of a second metal capable of being more easily machined than said blank to one of said ends; and forming a repeating optical pattern on the exposed end of said metal slug, said optical pattern comprising an array of between about 600 and, 400 cube-corner elements scribed thereon.

2. A method of making a tool for the production of an electroform for producing optical quality parts, comprising the steps of: forming a plurality of circular metallic pin blanks of high strength characteristics having first and second ends; coupling a slug of a second metal capable of being more easily machined than said blank to one of said ends of each of said blanks; forming the composite pin blanks and slugs to form elongated bimetallic pins each having a regular polygonal cross-section whereby such bi-metallic pins can be juxtaposed in a variety of patterns without gaps therebetween; placing said plurality of bi-metallic pins in a fixture without gaps between adjacent pins 'or between said pins and said fixture; and forming at least one optical quality surface on said second slug end of each of said bi-metallic pins.

3. The method of claim 2, wherein each of said pin blanks is formed of stainless steel.

4. The method of claim 2, wherein each of said pin blanks is formed of magnetic stainless steel.

5. The method of claim 2, wherein said metal slug is copper.

6. The method of claim 2, wherein each of said pin blanks is formed of magnetic stainless steel and said metal slugs are copper.

7. The method of claim 2, wherein each of said pin blanks is formed of magnetic stainless steel, said slugs are copper and said second slugs are plated onto said pin blank ends.

8. The method set forth in claim 2, wherein each said polygon has edges less than 0.17 inch long.

9. The method of claim 2 and further comprising the step of forming a repeating optical pattern on the exposed end of said each of metal slugs.

10. The method of claim 2, wherein said optical pattern comprises an array of between about 600 and 1400 cube-corner elements scribed thereon.

* * * * *